(12) United States Patent
Sasaki et al.

(10) Patent No.: US 9,225,109 B2
(45) Date of Patent: Dec. 29, 2015

(54) CONNECTOR

(71) Applicant: JAPAN AVIATION ELECTRONICS INDUSTRY, LIMITED, Shibuya-ku, Tokyo (JP)

(72) Inventors: Takuo Sasaki, Tokyo (JP); Takeshi Takahashi, Tokyo (JP)

(73) Assignee: JAPAN AVIATION ELECTRONICS INDUSTRY, LIMITED, Shibuya-Ku, Tokyo (JP)

( * ) Notice: Subject to any disclaimer, the term of this patent is extended or adjusted under 35 U.S.C. 154(b) by 0 days.

(21) Appl. No.: 14/467,386

(22) Filed: Aug. 25, 2014

(65) Prior Publication Data

US 2015/0111408 A1  Apr. 23, 2015

(30) Foreign Application Priority Data

Oct. 17, 2013 (JP) .................................. 2013-216790

(51) Int. Cl.
*H01R 13/627* (2006.01)
*H01R 13/639* (2006.01)
(Continued)

(52) U.S. Cl.
CPC ............ *H01R 13/627* (2013.01); *H01R 13/639* (2013.01); *H01R 13/641* (2013.01); *H01R 13/6683* (2013.01)

(58) Field of Classification Search
CPC .. H01R 13/627; H01R 13/641; H01R 13/639; H01R 13/6683
USPC .................. 439/357, 310, 304, 352; 320/320; 70/70, 340
See application file for complete search history.

(56) References Cited

U.S. PATENT DOCUMENTS 5,458,496 A * 10/1995 Itou ...................... B60L 11/1846
439/34
5,627,448 A * 5/1997 Okada ....................... B60L 3/12
320/109
(Continued)

FOREIGN PATENT DOCUMENTS

JP 2012130127 A 7/2012
JP 5080662 B2 11/2012
(Continued)

OTHER PUBLICATIONS

Extended European Search Report (EESR) dated Nov. 27, 2014 issued in counterpart European Application No. 14181391.5.

*Primary Examiner* — Abdullah Riyami
*Assistant Examiner* — Nelson R Burgos-Guntin
(74) *Attorney, Agent, or Firm* — Holtz, Holtz, Goodman & Chick PC

(57) ABSTRACT

A connector mateable with a mating connector having a locked portion. The connector comprises a lock member, a position detection mechanism, a lock maintenance member and a state detection mechanism. The lock member has a lock portion. The lock member is selectively positionable at a lock position or an unlock position. When the lock member is positioned at the lock position, the lock portion locks the locked portion to lock the mating of the connector with the mating connector. When the lock member is positioned at the unlock position, the connector is removable from the mating connector. The position detection mechanism detects whether the lock member is positioned at the lock position or the unlock position. The lock maintenance member is selectively takable a maintenance state or a permission state. The state detection mechanism detects whether the lock maintenance member is under the maintenance state or the permission state.

10 Claims, 11 Drawing Sheets

(51) Int. Cl.
*H01R 13/641* (2006.01)
*H01R 13/66* (2006.01)

(56) References Cited

U.S. PATENT DOCUMENTS

| | | | | |
|---|---|---|---|---|
| 5,676,560 A | * | 10/1997 | Endo | B60L 11/1818 439/310 |
| 6,123,569 A | * | 9/2000 | Fukushima | B60L 11/1818 439/310 |
| 6,283,781 B1 | * | 9/2001 | Mori | B60L 11/1818 439/310 |
| 7,008,116 B2 | * | 3/2006 | Kobayashi | G02B 6/389 385/53 |
| 7,963,793 B2 | * | 6/2011 | Poulin | B60L 11/1818 439/34 |
| 7,980,880 B2 | * | 7/2011 | Kodama | H01R 13/6272 439/352 |
| 8,025,526 B1 | | 9/2011 | Tormey et al. | |
| 8,075,329 B1 | * | 12/2011 | Janarthanam | B60L 11/1818 439/304 |
| 8,523,596 B2 | * | 9/2013 | Inoue | G07C 9/00182 439/310 |
| 8,568,155 B2 | * | 10/2013 | Sebald | B60L 11/1818 439/304 |
| 8,968,021 B1 | * | 3/2015 | Kennedy | H01R 13/6273 439/352 |
| 9,106,015 B2 | * | 8/2015 | Ohmura | H01R 13/6275 |
| 9,113,880 B2 | * | 8/2015 | Zemlok | A61B 17/07207 |
| 2008/0150718 A1 | | 6/2008 | Apfel | |
| 2011/0075974 A1 | * | 3/2011 | Katagiyama | G02B 6/3887 385/78 |
| 2011/0123156 A1 | * | 5/2011 | Koreeda | G02B 6/3825 385/53 |
| 2011/0130035 A1 | * | 6/2011 | Ebihara | H01R 13/5205 439/587 |
| 2012/0108097 A1 | * | 5/2012 | Takagi | H01R 13/6275 439/345 |
| 2012/0135625 A1 | * | 5/2012 | Yokoyama | H01R 43/16 439/345 |
| 2012/0232761 A1 | | 9/2012 | Charnesky | |
| 2012/0234061 A1 | | 9/2012 | Inoue et al. | |
| 2012/0238122 A1 | * | 9/2012 | Hirashita | B60L 11/1818 439/304 |
| 2013/0078840 A1 | | 3/2013 | Inoue et al. | |
| 2013/0109243 A1 | * | 5/2013 | Toda | H01R 13/622 439/662 |
| 2013/0250506 A1 | | 9/2013 | Fujiwara | |
| 2013/0301993 A1 | * | 11/2013 | Toda | G02B 6/36 385/76 |
| 2013/0303014 A1 | | 11/2013 | Takagi et al. | |
| 2014/0170879 A1 | * | 6/2014 | Kahara | B60L 1/003 439/304 |
| 2014/0322952 A1 | | 10/2014 | Ohmura | |
| 2015/0011111 A1 | * | 1/2015 | Toratani | H01R 13/6683 439/357 |
| 2015/0111408 A1 | * | 4/2015 | Sasaki | H01R 13/627 439/357 |

FOREIGN PATENT DOCUMENTS

| | | |
|---|---|---|
| JP | 2013008466 A | 1/2013 |
| WO | 2008142490 A1 | 11/2008 |
| WO | 2013108338 A1 | 7/2013 |

* cited by examiner

C1: lock position and maintenance state
C2: unlock position and maintenance state
C3: lock position and permission state
C4: unlock position and permission state

CONNECTOR

CROSS REFERENCE TO RELATED APPLICATIONS

The applicant claims priority under 35 U.S.C. §119 of Japanese Patent Application No. JP2013-216790 filed Oct. 17, 2013.

BACKGROUND OF THE INVENTION

This invention relates to a connector which is mated with a mating connector upon transmission or reception of electric power. For example, this invention relates to a charging connector or plug which is mated with a receiving connector or inlet provided on Electric Vehicle (EV). For example, this invention relates to a receiving connector which is mated with a power supply connector provided on Electric Vehicle suppliable electric power.

This type of connector is disclosed in JP-A 2013-8466 (Patent Document 1). As shown in FIG. 21, when the connector of Patent Document 1 is not mated with a mating connector (not shown), a lock arm is pressed by a coil spring so that a hook is positioned inside of a body. At that time, a microswitch is under an open state, and a solenoid is not energized.

When a connector is mated with a mating connector (not shown), a slide cover is brought into abutment with a part of the mating connector to be moved in a positive Y-direction so that a hook is exposed. An operation ring is moved in the positive Y-direction to press the hook from inside of the body toward the outside thereof. Accordingly, the projecting hook is hooked with a hooked portion of the mating connector (not shown). At that time, a cancellation button is also moved in the positive Y-direction. Furthermore, when electric power is supplied to the solenoid, the solenoid is energized so that a plunger projects in a positive X-direction. Thus, a position of the operation ring is locked so that a movement of the hook is restricted. Therefore, the connector is prevented from coming off from the mating connector (not shown) upon electric power supply.

When electric power supply is stopped, energization to the solenoid is also stopped. Accordingly, the plunger returns in a negative X-direction. After that, the cancellation button is pressed in a negative Y-direction upon a removal of the connector from the mating connector. Thus, the operation ring is moved in the negative Y-direction so that the hook is moved inside the body by using a force of the coil spring. Therefore, a hooking of the hook with the hooked portion of the mating connector (not shown) is released so that the connector can be removed from the mating connector.

In the connector of Patent Document 1, when the plunger is not returned in the negative X-direction in spite of stop of energization to the solenoid, the plunger is pressed in the negative X-direction by using a releasing rod (not shown).

A solenoid is expensive so that a problem of an increase in cost occurs. In addition, a size of a solenoid unit is big so that a miniaturization of a connector is prevented.

Furthermore, in the connector of Patent Document 1, if the plunger do not project in spite of energization to the solenoid, coming-off of the connector is not prevented. In addition, in the connector of Patent Document 1, there is a possibility that the plunger is unable to be pressed by the cancellation rod or the like if the plunger is not returned back to an original position in spite of stop of energization to the solenoid.

SUMMARY OF THE INVENTION

It is therefore an object of the present invention to provide a connector which solves drawbacks of a connector using a solenoid.

For solving the aforementioned problems, this invention provides a connector comprising a lock maintenance member operated manually, instead of a solenoid. Additionally, not only position detection of a lock member but also state detection of a lock maintenance member are performed so that a cause is easily specified especially in a case where electric power is unable to be supplied.

More specifically, one aspect (first aspect) of the present invention provides a connector mateable with a mating connector having a locked portion. The connector comprising a lock member, a position detection mechanism, a lock maintenance member and a state detection mechanism. The lock member has a lock portion. The lock member is selectively positionable at a lock position or an unlock position. When the lock member is positioned at the lock position, the lock portion locks the locked portion to lock a mating of the connector with the mating connector. When the lock member is positioned at the unlock position, the connector is removable from the mating connector. The position detection mechanism detects whether the lock member is positioned at the lock position or the unlock position. The lock maintenance member selectively takable a maintenance state or a permission state. When the lock maintenance member is under the maintenance state, the lock maintenance member restricts a movement of the lock member from the lock position to the unlock position to maintain a lock of the mating. When the lock maintenance member is under the permission state, the lock maintenance member permits the lock member to move from the lock position to the unlock position. The state detection mechanism detects whether the lock maintenance member is under the maintenance state or the permission state.

The connector of present invention is provided, instead of a solenoid, with a lock maintenance member operated manually so that the connector can be formed at low cost while miniaturization of the connector can be achieved.

In addition, the lock maintenance member is manually operated to switch its state directly between the maintenance state and the permission state. Therefore, although the conventional technique has a trouble in switching caused by malfunction of a plunger, such a trouble does not occur in the connector of the present invention.

Furthermore, by provision of two detection mechanisms, i.e. a position detection mechanism and a state detection mechanism, it can be identified whether a situation where electric power is unable to be supplied is caused by the lock portion not locking the locked portion or by the lock maintenance member not maintaining a lock.

An appreciation of the objectives of the present invention and a more complete understanding of its structure may be had by studying the following description of the preferred embodiment and by referring to the accompanying drawings.

Figure 1:
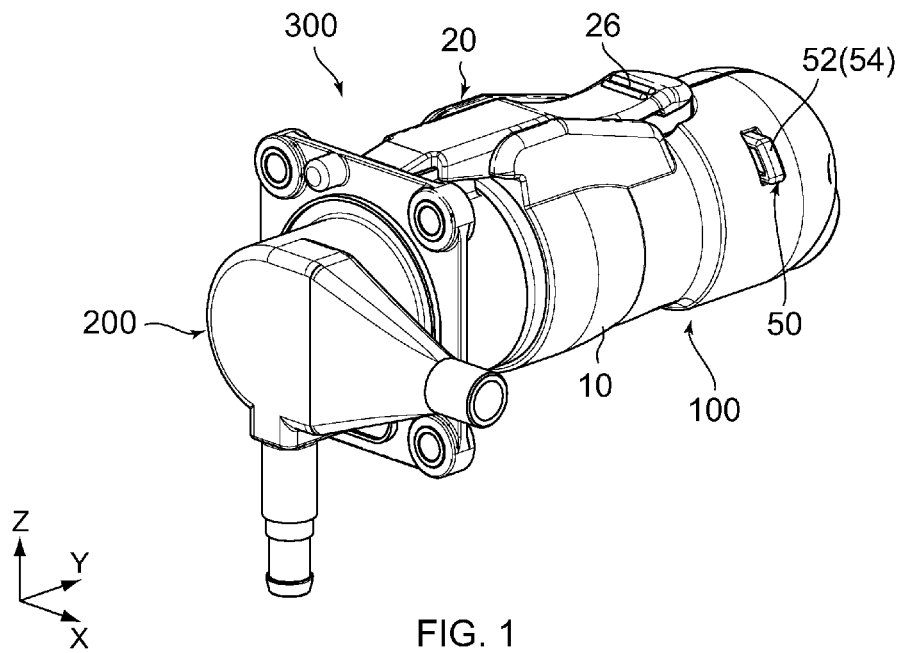
FIG. 1 is a perspective view showing a connector assembly comprising a connector and a mating connector according to an embodiment of the present invention. The connector and the mating connector are in a mated state.
Figure 2:
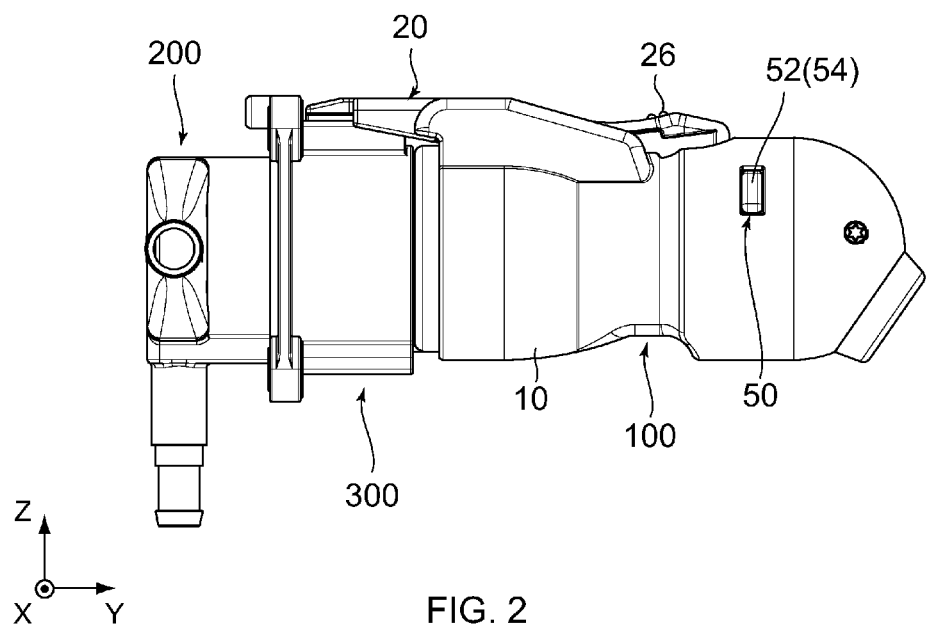
FIG. 2 is a side view showing the connector assembly of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 3:
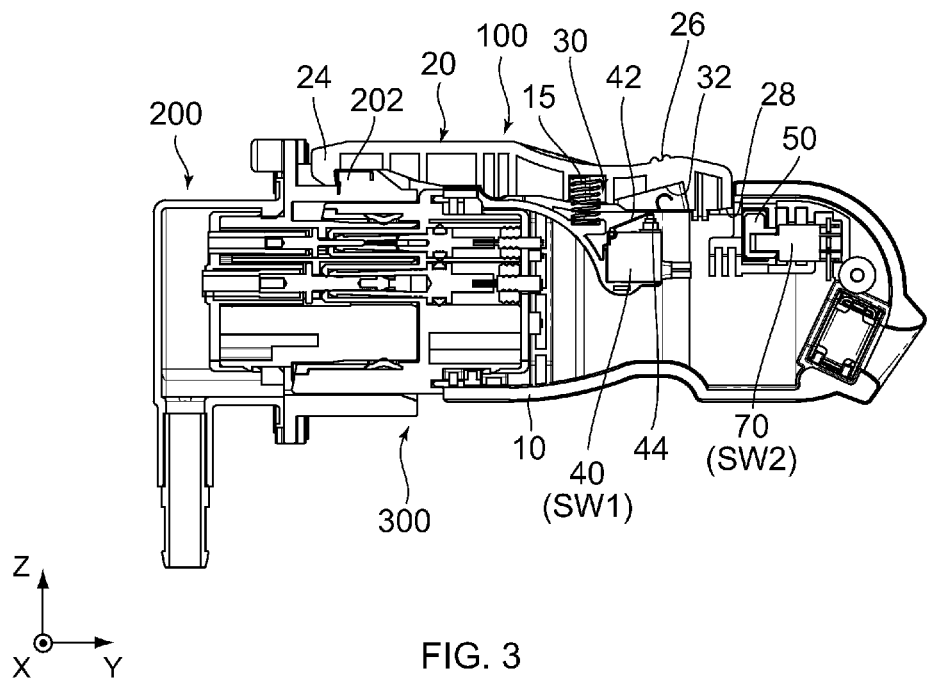
FIG. 3 is a cross-sectional view showing the connector assembly of FIG. 1. The lock portion of the connector is positioned at a lock position.
Figure 4:
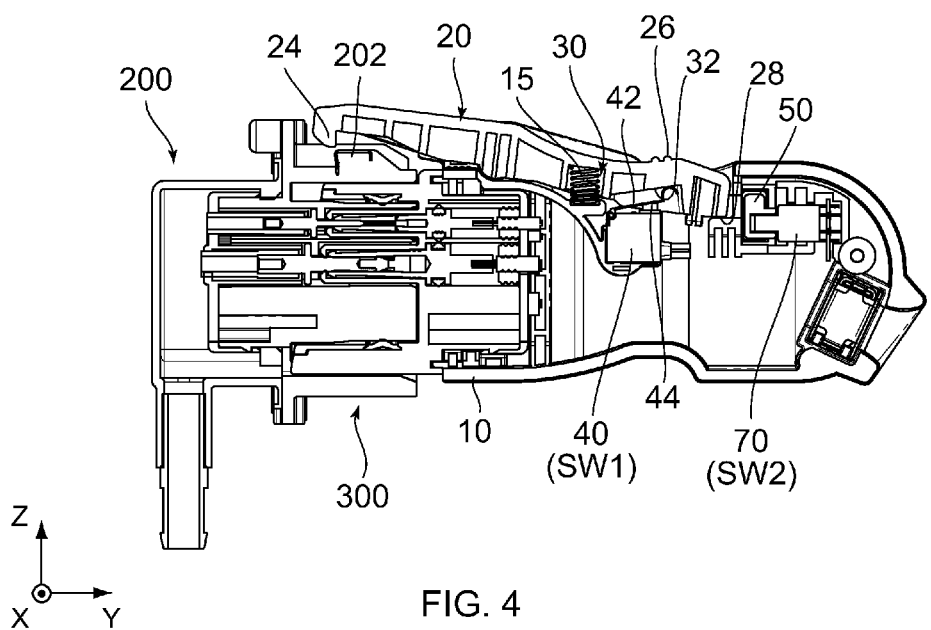
FIG. 4 is a cross-sectional view showing the connector assembly of FIG. 3. The lock portion is positioned at an unlock position.
Figure 5:
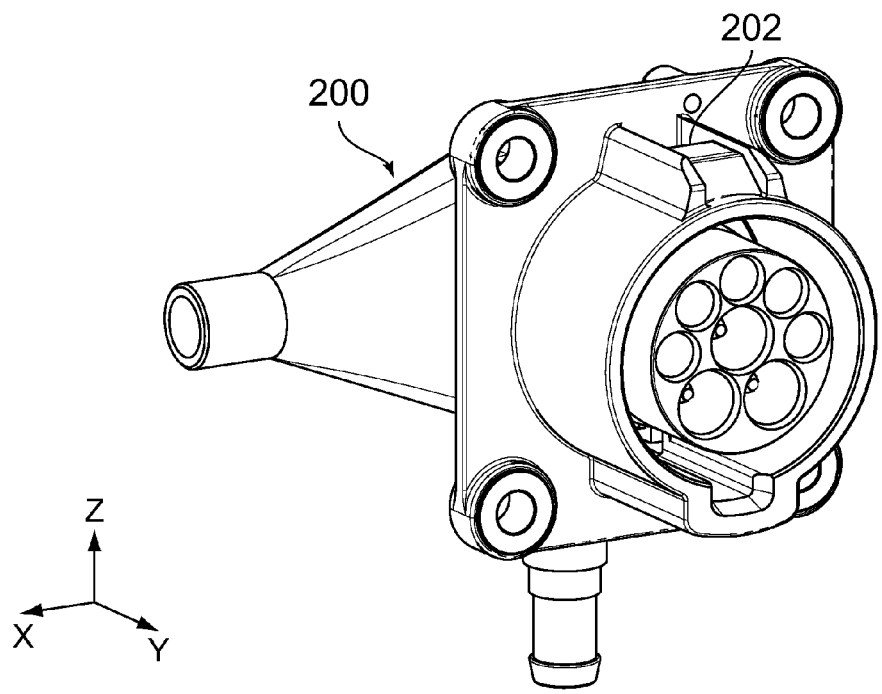
FIG. 5 is a perspective view showing a mating connector of FIG. 1.
Figure 6:
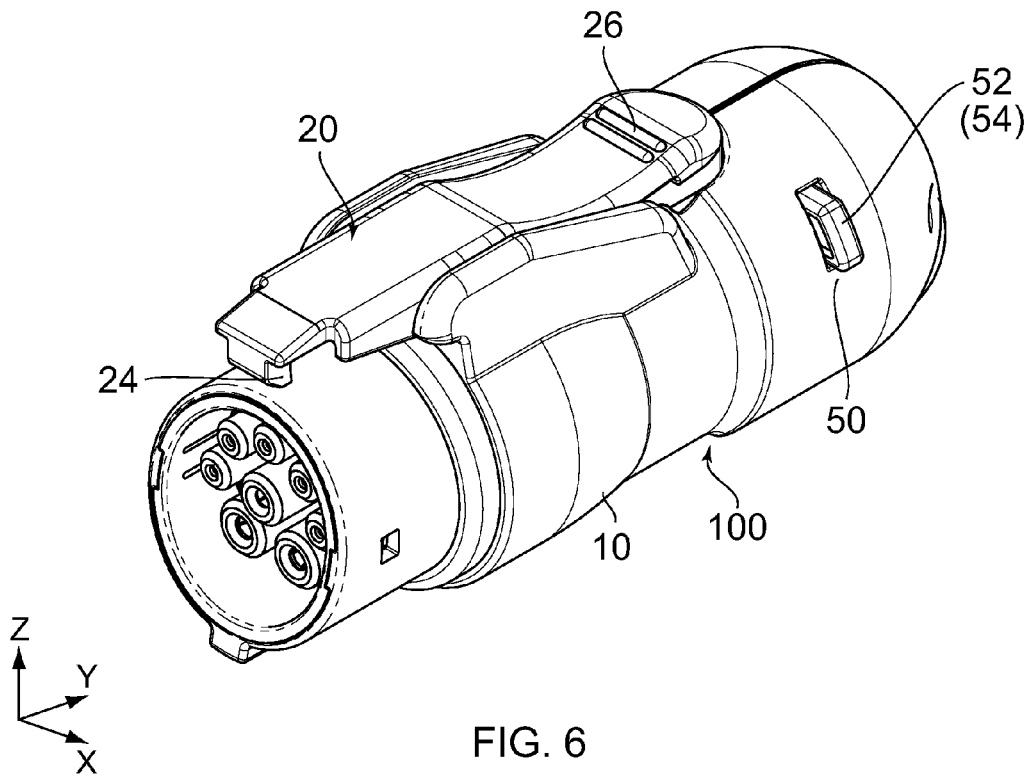
FIG. 6 is a perspective view showing a mating connector of FIG. 1.

Referring to FIGS. 1 to 6, a connector assembly 300 according to an embodiment of the present invention comprises a connector (plug) 100 and a mating connector (inlet) 200 mateable with the connector 100 in a Y-direction (front-rear direction). For example, the mating connector 200 is a receiving connector provided on Electric Vehicle, while the connector 100 is a charging connector or a power supply connector which is connected with a cable extending from an electric power supply system. The mating connector 200 may be a power supply connector provided on Electric Vehicle and the connector 100 may be a receiving connector which receives electric power from Electric Vehicle. As shown in FIGS. 3 to 5, the mating connector 200 is provided with a locked portion 202.

As understood in FIGS. 3 to 13, the connector 100 according to the present embodiment comprises a housing 10, a bias member 15 formed of a coil spring, a lock member 20 formed of a lock lever, a position detection mechanism 40, and a lock maintenance member 50 formed of a slider and a state detection mechanism 70.

Figure 14:
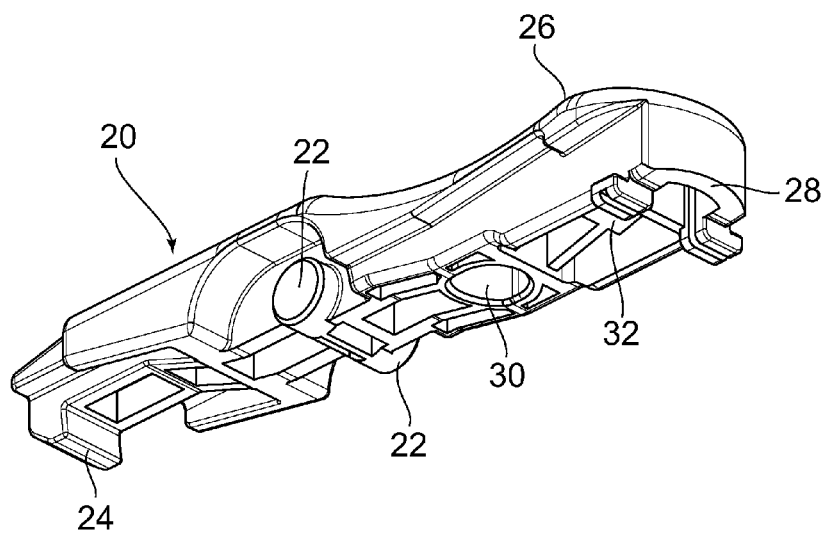
FIG. 14 is a perspective view showing the lock member of FIG. 7.

As shown in FIG. 14, the lock member 20 has a pivot 22, a lock portion 24, a first operation portion 26, a restricted portion 28, an accommodation portion 30 and a press portion 32. The pivot 22 is positioned between the lock portion 24 and the first operation portion 26. The restricted portion 28 is formed on an one end of the lock member 20. The accommodation portion 30 and the press portion 32 are positioned between the pivot 22 and the first operation portion 26. In the present embodiment, the press portion 32 is positioned between the accommodation portion 30 and the restricted portion 28.

As apparent from FIG. 14, the lock member 20 according to the present embodiment is formed of a single member. Specifically, the lock portion 24 and the first operation portion 26 are formed on the common member. Accordingly, the lock portion 24 is directly operated by operating the first operation portion 26.

As shown in FIGS. 3, 4, 7, 8 and 11, the lock member 20 is supported by the housing 10. The pivot 22 extends toward an X-direction. The lock portion 24 and the first operation portion 26 are movable in a seesaw manner with the pivot 22 as a center. In other word, the lock portion 24 is moved toward a positive Z-side (upper side) when the first operation portion 26 is moved toward a negative Z-side (lower side), while the lock portion 24 is moved toward the negative Z-side when the first operation portion 26 is moved toward the positive Z-side. The first operation portion 26, the restricted portion 28 and the press portion 32 are provided in the vicinity of the one end of the lock member 20. More specifically, the first operation portion 26 is positioned at the positive Z-side above the restricted portion 28 and the press portion 32, the restricted portion 28 and the press portion 32 are positioned at the negative Z-side below the first operation portion 26.

Figure 7:
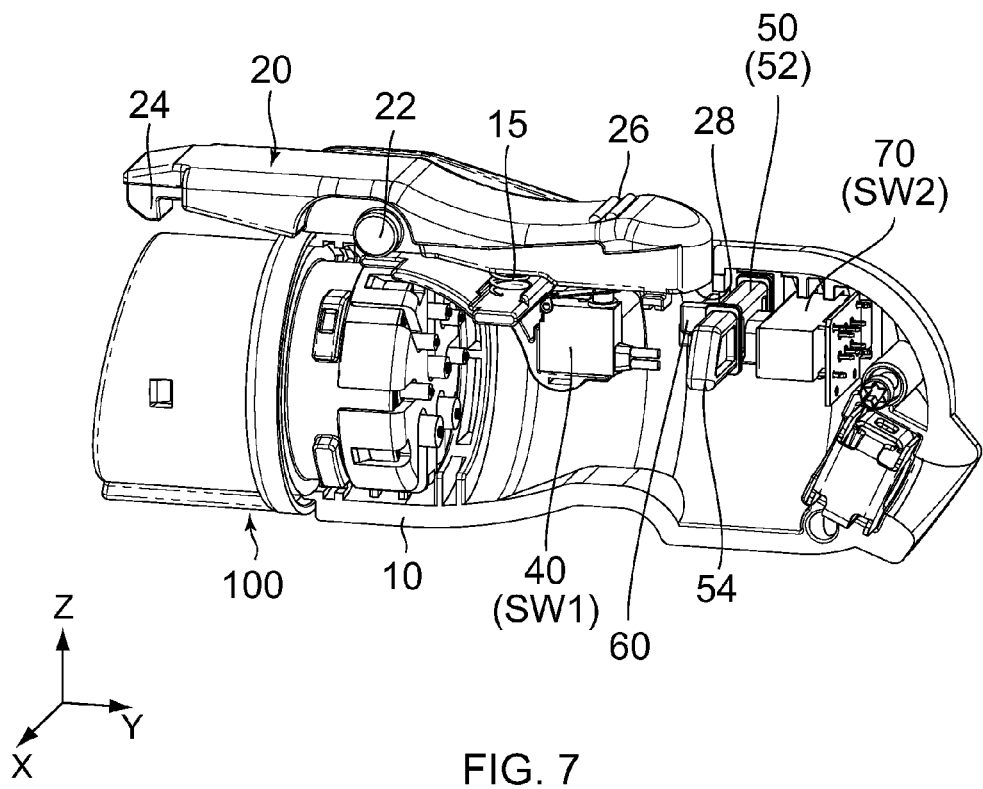
FIG. 7 is a partially cutaway cross-sectional, perspective view showing the connector of FIG. 6. A lock maintenance member is under a permission state, and the lock portion is positioned at a lock position.
Figure 8:
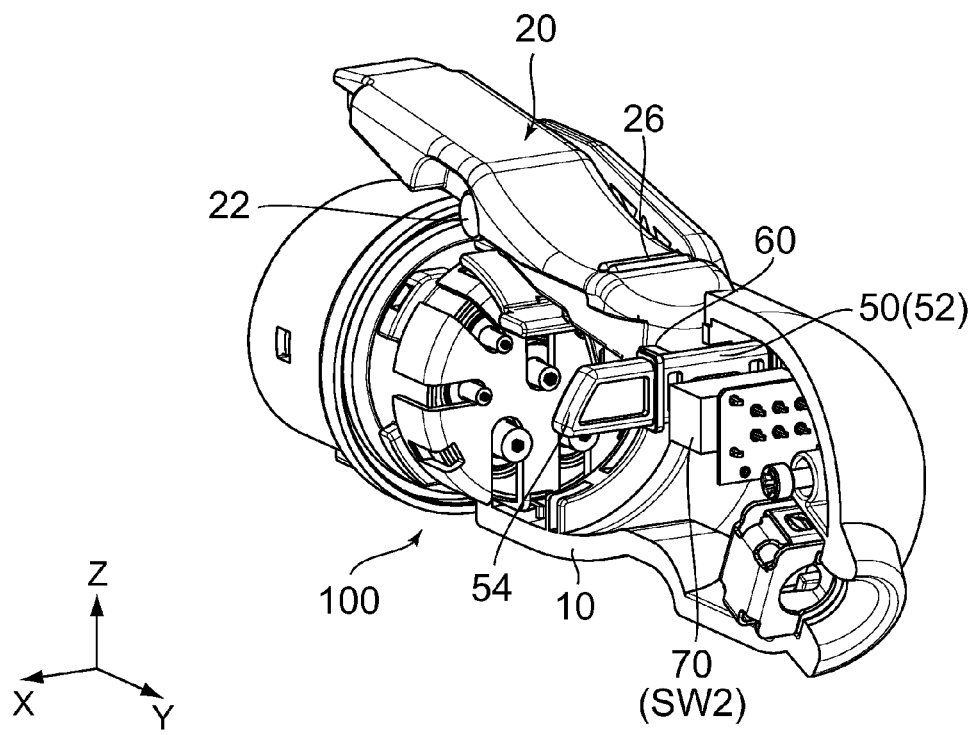
FIG. 8 is a partially-cutaway, cross-sectional, perspective view showing the connector of FIG. 6. A lock maintenance member is under the permission state, and the lock portion is positioned as the unlock position.
Figure 9:
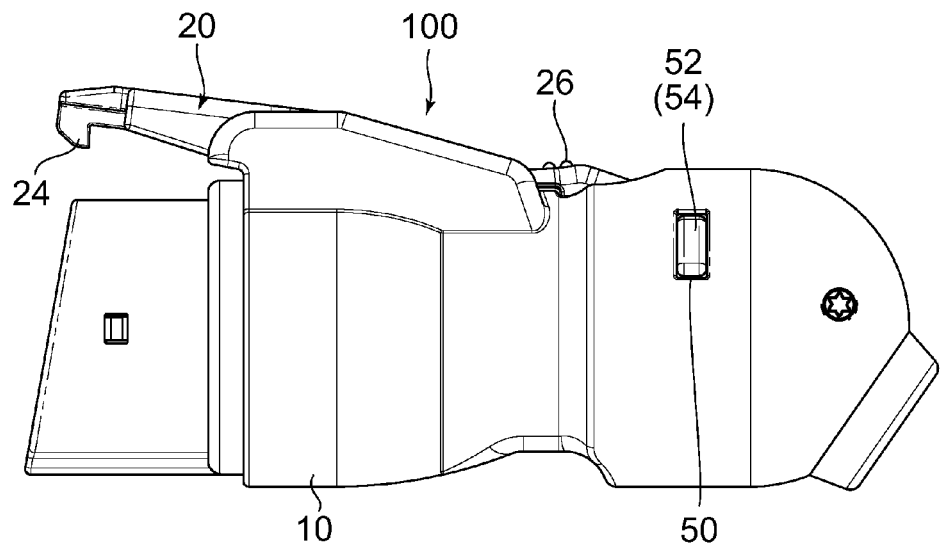
FIG. 9 is a side view showing the connector of FIG. 8.
Figure 10:
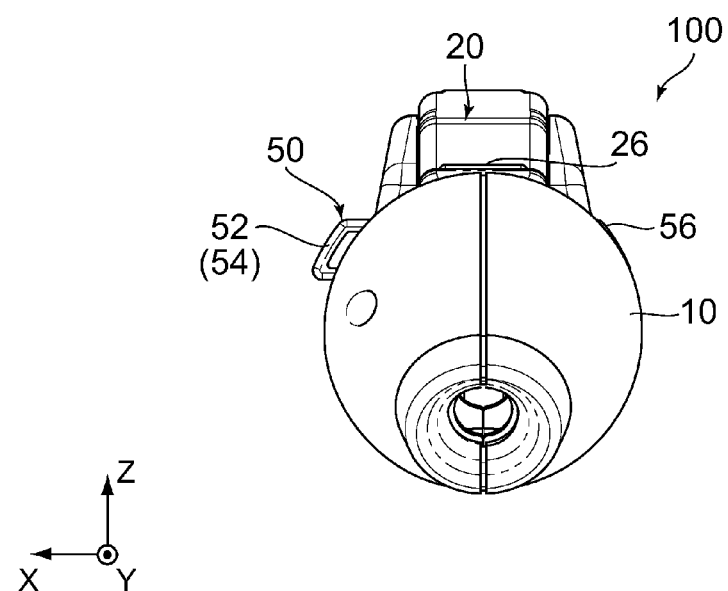
FIG. 10 is a rear view showing the connector of FIG. 8.
Figure 11:
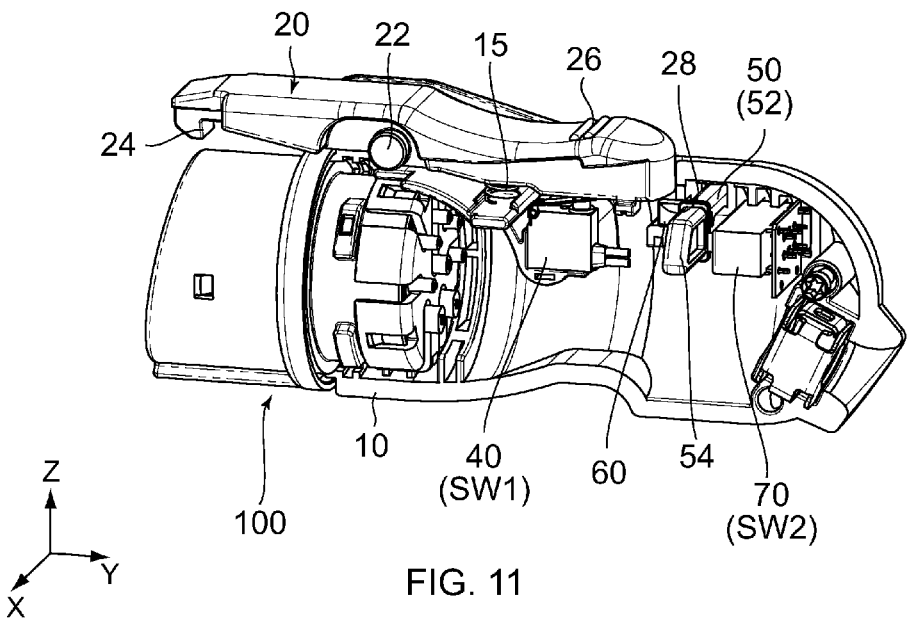
FIG. 11 is a partially-cutaway, cross-sectional, perspective view showing the connector of FIG. 6. The lock member is positioned at the lock position, and the lock maintenance member is under a maintenance state.
Figure 12:
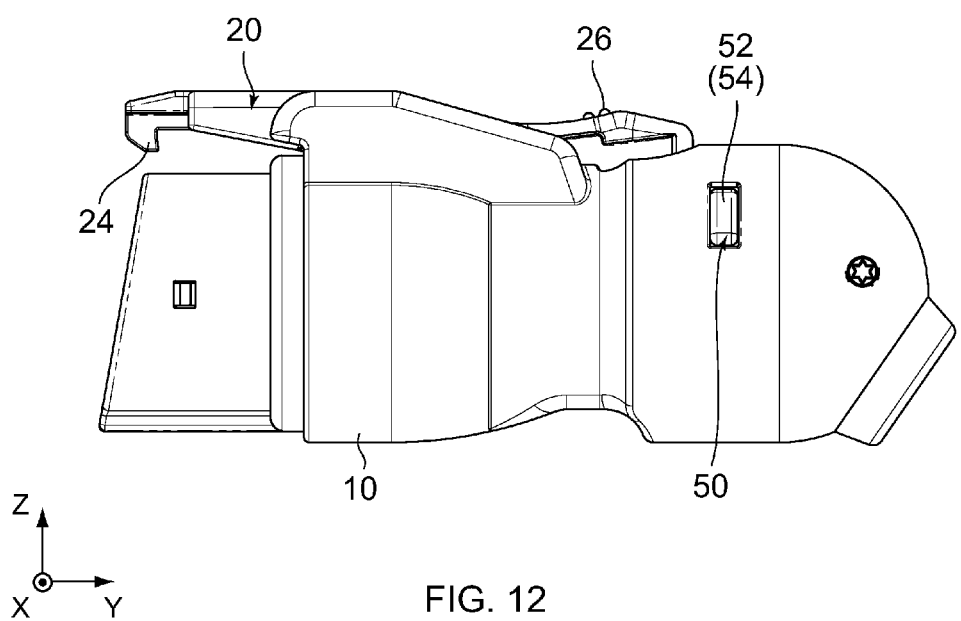
FIG. 12 is a side view showing the connector of FIG. 11.

The accommodation portion 30 of the lock member 20 accommodates the bias member (coil spring) 15. An one end of the bias member 15 is fixed to the housing 10, while the other end of the bias member 15 is abutted to an inside of the accommodation portion 30. Thus, the accommodation portion 30 continues to receive a spring force directed toward a positive Z-direction (upward). Accordingly, when the first operation portion 26 is not operated, the lock portion 24 is positioned at a position shown in FIGS. 3, 7 and 11. The position of the lock member 20 shown in FIGS. 3, 7 and 11 is referred to as "lock position". When the first operation portion 26 is operated to be pressed in a negative Z-direction (first operation direction: downward), the lock portion 24 is moved in the positive Z-direction as shown in FIGS. 4 and 8. A position of the lock member 20 shown in FIGS. 4 and 8 is referred to as "unlock position".

Thus, the lock member 20 is selectively positionable at the lock position or the unlock position. The lock member 20 of the present invention is urged to be moved to the lock position by the bias member 15. When the first operation portion 26 is operated in the first operation direction (negative Z-direction), the lock member 20 is moved from the lock position to the unlock position. When the operation of the first operation portion 26 is stopped, the lock member 20 returns to the lock position again by the bias member 15.

As understood from FIG. 3, when the lock member 20 is positioned at the lock position, the lock portion 24 locks the locked portion 202 of the mating connector 200 to lock a mating of the connector 100 with the mating connector 200. As understood from FIG. 4, when the lock member 20 is positioned at the unlock position, the lock of the lock portion 24 with the locked portion 202 of the mating connector 200 is released. Therefore, when the lock member 20 is positioned at the unlock position, the connector 100 is removable from the mating connector 200.

As understood in FIGS. 3 and 4, the position detection mechanism 40 is to detect whether the lock member 20 is positioned at the lock position or the unlock position.

Figure 18:
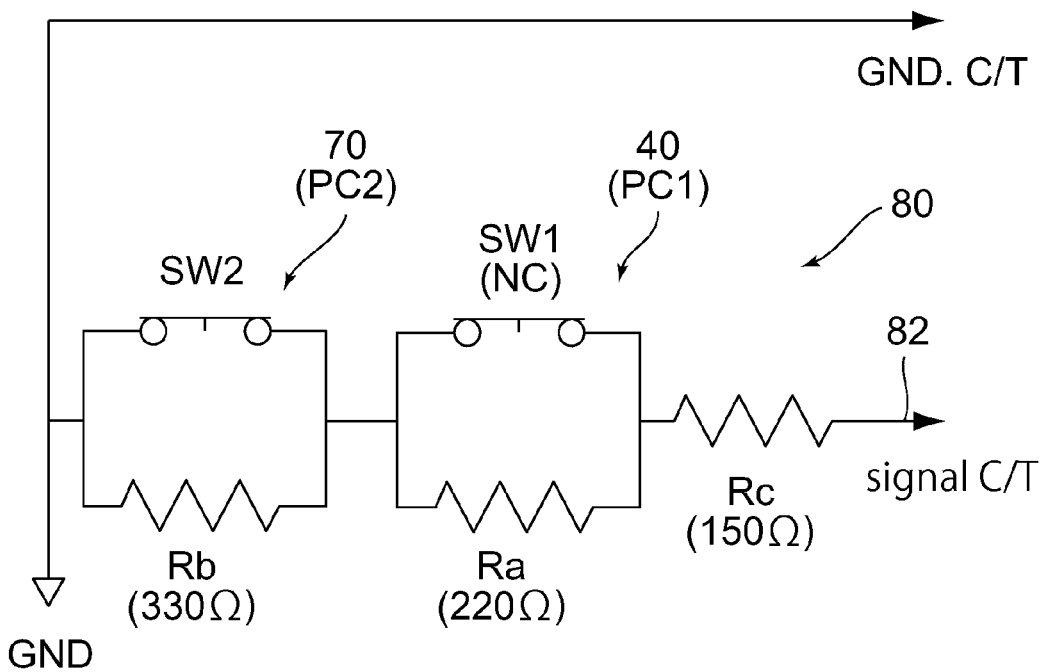
FIG. 18 is a circuit diagram showing a comprehensive detection mechanism which comprises a position detection mechanism and a state detection mechanism of the connector according to the embodiment of the present invention.

As understood in FIG. 18, the position detection mechanism 40 according to the present embodiment has a first parallel circuit PC1 which is constituted by connecting a first switch SW1 and a first resistor Ra in parallel. A resistance value of the first resistor Ra according to the present embodiment is 220Ω. The first resistor Ra may have another resistance value. In addition, instead of the first resistor Ra, another impedance element may be used.

The first parallel circuit PC1 has a first variable impedance which has an impedance variable in response to a switching condition of the first switch SW1. More specifically, an impedance of the first variable impedance is 0Ω when the first switch SW1 is closed while being 220Ω when the first switch SW1 is opened.

Figure 15:
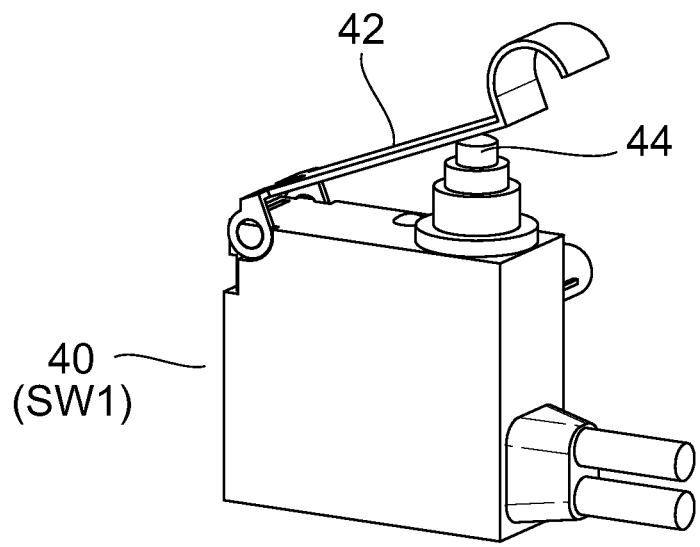
FIG. 15 is a perspective view showing a first switch of FIG. 7.

As shown in FIG. 15, the first switch SW1 according to the present embodiment is formed of a limit switch in which an end of an arm 42 is pressed so that a button 44 is pressed. The first switch SW1 is a normally closed type switch. In other word, the first switch SW1 is closed under a normal state, while the first switch SW1 is opened when the button 44 is pressed through the arm 42.

As shown in FIGS. 3, 4, 7 and 11, the first switch SW1 is installed within the housing 10. The first switch SW1 is positioned at the negative Z-side (downward) of the lock member 20. In particular, as shown in FIGS. 3 and 4, the end of the arm 42 is positioned at the negative Z-side (downward) of the press portion 32 of the lock member 20. As understood from FIG. 3, when the lock member 20 is positioned at the lock position, the arm 42 is not brought into contact with the press portion 32. Thus, the first switch SW1 is closed. As understood from FIG. 4, when the lock member 20 is positioned at the unlock position, the arm 42 is pressed by the press portion 32 so that the button 44 is pressed. Thus, the first switch SW1 is opened. As understood from the above, the switching condition of the first switch SW1 is changed over in accordance with whether the lock member 20 is positioned at the lock position or the unlock position. In addition, if the first switch SW1 is closed (i.e. if the button 44 is not pressed) when the lock member 20 is positioned at the lock position, the arm 42 and the press portion 32 may be brought into contact with each other. In order to control a switching condition of the first switch SW1 as intended in consideration of unevenness on production quality and unevenness on assembly, it is preferable that the arm 42 and the press portion 32 are not brought into contact with each other when the lock member 20 is positioned at the lock position.

Figure 16:
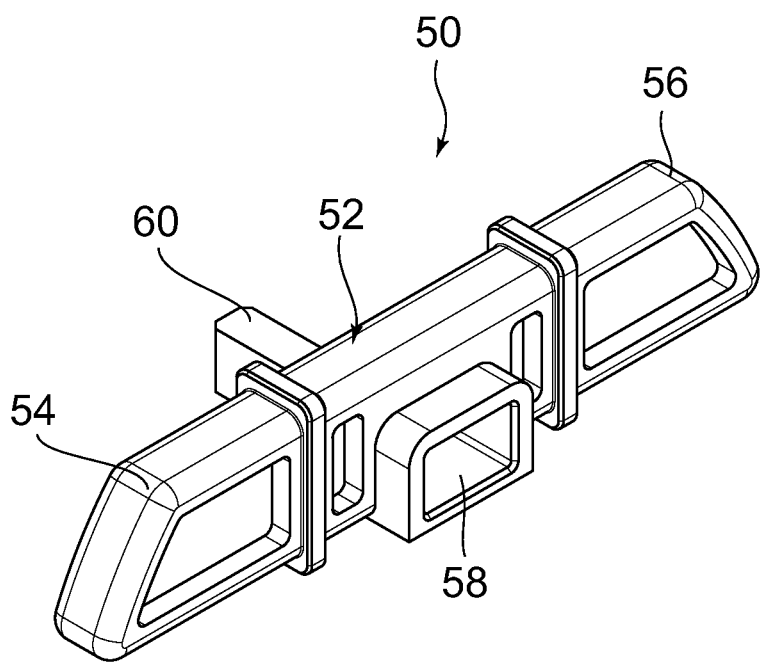
FIG. 16 is a perspective view showing the lock maintenance member of FIG. 7.

As shown in FIG. 16, the lock maintenance member 50 according to the present embodiment has a main portion 52 and a stopper 60 projecting out in a direction perpendicular to the main portion 52. The main portion 52 is provided with a receiving portion 58 recessed in a projecting direction of the stopper 60. Both ends of the main portion 52 serve as a second operation portion 54 and a third operation portion 56, respectively. The second operation portion 54 and the third operation portion 56 have end portions extending toward an oblique direction, respectively. As described later, shapes of the second operation portion 54 and the third operation portion 56 match with an outer shape of the housing 10. If the housing 10 has a shape different from the outer shape, the second operation portion 54 and the third operation portion 56 may have shapes other than the shapes.

As shown in FIGS. 7, 8 and 11, the lock maintenance member 50 is held by the housing 10. The main portion 52 extends along the X-direction (lateral direction) so that the lock maintenance member 50 is slidable along the X-direction. The main portion 52 is positioned at a positive Y-side (rear side) of the lock member 20. The stopper 60 projects in a negative Y-direction (forward: third direction) from the main portion 52.

Figure 13:
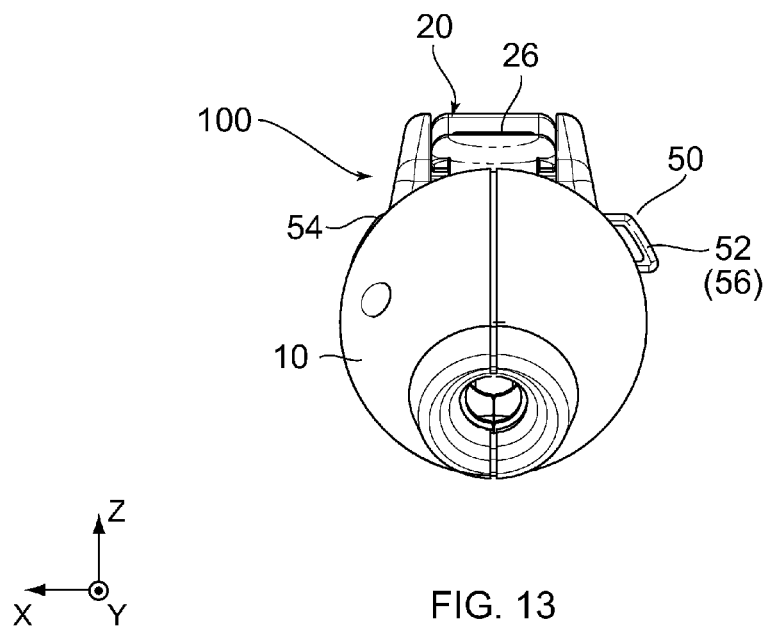
FIG. 13 is a rear view showing the connector of FIG. 11.

The lock maintenance member 50 is selectively takable one of two states: a state where the second operation portion 54 greatly projects out from the housing 10 (see FIGS. 6 and 10); and a state where the third operation portion 56 greatly projects out from the housing 10 (see FIG. 13). The former state of the lock maintenance member 50 is referred to as "maintenance state". The latter state of the lock maintenance member 50 is referred to as "permission state". Specifically, when the second operation portion 54 is pressed along a negative X-direction (second operation direction), the third operation portion 56 greatly projects out from the housing 10 so that the lock maintenance member 50 transits a state thereof from the permission state to the maintenance state. When the third operation portion 56 is pressed along a positive X-direction (direction opposite to the second operation direction), the second operation portion 54 greatly projects out from the housing 10 so that the lock maintenance member 50 transits a state thereof from the maintenance state to the permission state.

As shown in FIGS. 7 and 11, because there is an empty space in the negative Z-side (down side) of the restricted portion 28 when the lock member 20 is positioned at the lock position, the lock maintenance member 50 does not abut against the stopper 60 even if the lock maintenance member 50 slides toward the X-direction so that the stopper 60 is moved in the X-direction. In other word, when the lock member 20 is positioned at the lock position, the lock maintenance member 50 is selectively takable the maintenance state or the permission state.

As shown in FIG. 11, when the lock maintenance member 50 is under the maintenance state, the stopper 60 is positioned at the negative Z-side of the restricted portion 28 of the lock member 20. Therefore, even if the lock member 20 is urged to be moved to the unlock position by operating the first operation portion 26 of the lock member 20, the restricted portion 28 abuts against the stopper 60 so that the lock member 20 is unable to be moved to the unlock position. In other word, when the lock maintenance member 50 is under the maintenance state, the stopper 60 restricts a movement of the restricted portion 28 of the lock member 20 so that the lock member 20 is restricted to be moved from the lock position to the unlock position and that the mating of the connector 100 with the mating connector 200 is locked.

As understood in FIGS. 7 and 8, when the lock maintenance member 50 is under the permission state, the stopper 60 is not positioned at the negative Z-side of the restricted portion 28 of the lock member 20. Therefore, the stopper 60 does not restrict a movement of the lock member 20 so that the lock member 20 is freely positionable between the lock position and the unlock position. In other word, when the lock maintenance member 50 is under the permission state, the lock member 20 is freely movable between the lock position and the unlock position.

As shown in FIG. 8, when the lock member 20 is positioned at the unlock position, the stopper 60 is positioned at the positive X-side of the lock member 20. Therefore, even if the lock maintenance member 50 is urged to slide toward the negative X-direction, the stopper 60 abuts against the lock member 20 so that the lock maintenance member 50 is unable to be moved. In other word, when the lock member 20 is under the unlock position, the lock maintenance member 50 is unable to transit a state thereof to the permission state.

As understood in FIGS. 7, 8 and 11, the state detection mechanism 70 is combined with the lock maintenance member 50. The state detection mechanism 70 is to detect whether the lock maintenance member 50 is under the maintenance state or the permission state.

As understood in FIG. 18, the state detection mechanism 70 according to the present embodiment has a second parallel circuit PC2 which is constituted by connecting a second switch SW2 and a second resistor Rb in parallel. A resistance value of the second resistor Rb according to the present embodiment is 330Ω. The second resistor Rb may have another resistance value. Instead of the second resistor Rb, another impedance element may be used. However, in a circuit structure according to the present embodiment, in order to be able to distinguish between a detection result of the state detection mechanism 70 and a detection result of the position detection mechanism 40, it is necessary that the second resistor Rb has a resistance value which is different from a resistance value of the first resistor Ra.

The second parallel circuit PC2 has a second variable impedance which has an impedance variable in accordance with a switching condition of the second switch SW2. More specifically, an impedance of the second variable impedance is 0Ω when the second switch SW2 is closed while being is 330Ω when the second switch SW2 is opened.

Figure 17:
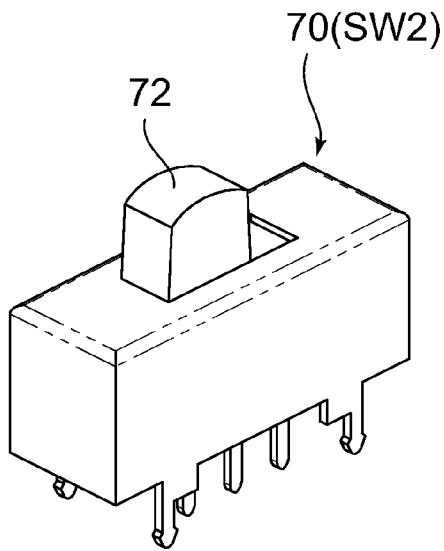
FIG. 17 is a perspective view showing a second switch of FIG. 7.

As shown in FIG. 17, the second switch SW2 according to the present embodiment is a slide switch. The switching condition of the second switch SW2 is changed over by sliding a tab 72.

As shown in FIGS. 3, 4, 7, 8 and 11, the second switch SW2 is installed within the housing 10 and is positioned at the positive Y-side (rear side) of the lock maintenance member 50. In particular, the tab 72 of the second switch SW2 is engaged in the receiving portion 58 of the lock maintenance member 50. The second switch SW2 can be turned on/off by sliding operation of the lock maintenance member 50. More specifically, when the lock maintenance member 50 is under the maintenance state, i.e., when the third operation portion 56 greatly projects out from the housing 10, the second switch SW2 is closed. When the lock maintenance member 50 is under the permission state, i.e., when the second operation portion 54 greatly projects out from the housing 10, the second switch SW2 is opened.

As shown in FIG. 18, in the present embodiment, the position detection mechanism 40 and the state detection mechanism 70 are connected with each other to form a single comprehensive detection mechanism 80 which has a single output portion 82. More specifically, the comprehensive detection mechanism 80 according to the present embodiment has a circuit which is formed by connecting the first parallel circuit PC1, the second parallel circuit PC2 and a third resistor Rc in series. Accordingly, the comprehensive detection mechanism 80 has a combined variable impedance in which the first variable impedance, the second variable impedance and resistance value (impedance) of the third resistor Rc are combined.

Figure 19:
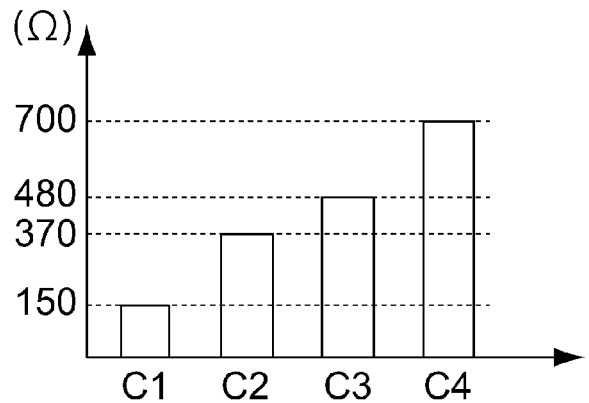
FIG. 19 is a graph showing a detection result of the comprehensive detection mechanism of FIG. 18.

As shown in FIG. 19, the combined variable impedance has four kinds of impedances according to combinations of the detection result of the position detection mechanism 40 and the detection result of the state detection mechanism 70. This change of impedance is reflected on a signal outputted from the output portion 82 of the comprehensive detection mechanism 80. Specifically, the signal output from the output portion 82 includes the detection result of the position detection mechanism 40 and the detection result of the state detection mechanism 70, which are superposed with each other.

More specifically, when the first switch SW1 is closed while the second switch SW2 is closed, the lock member 20 is positioned at the lock position while the lock maintenance member 50 is under the maintenance state (combination C1). Therefore, when the connector 100 is mated with the mating connector 200, electric power can be transmitted and received. When the first switch SW1 is opened while the second switch SW2 is closed, the lock member 20 is positioned at the unlock position while the lock maintenance member 50 is under the maintenance state (combination C2). The combination C2 cannot occur under a state where each component of the connector 100 is properly moved. Specifically, there is a high possibility that the combination C2 occurs under a state where the components are improperly engaged with each other. When the first switch SW1 is closed while the second switch SW2 is opened, the lock member 20 is positioned at the lock position while the lock maintenance member 50 is under the permission state (combination C3). Specifically, the lock maintenance member 50 is, either intentionally or unintentionally, under the permission state. For example, the combination C3 may indicate that the lock maintenance member 50 is misunderstood to take the maintenance state and that the stopper 60 is unable to restrict the movement of the restricted portion 28 by an imperfect operation of the second operation portion 54. In this case, the first operation portion 26 is freely operable so that there is a high possibility that the connector 100 is come off from the mating connector 200 by easily releasing the lock. When the first switch SW1 is opened while the second switch SW2 is opened, the lock member 20 is positioned at the unlock position while the lock maintenance member 50 is under the permission state (combination C4). Specifically, the combination C4 indicates that the first operation portion 26 of the lock member 20 is intended to be operated to unlock the lock. Thus, in the present embodiment, a position of the lock member 20 and a state of the lock maintenance member 50 can be grasped in detail.

In a system (e.g., power supply system) employing the connector 100 according to the present embodiment, four kinds of the detection results can be displayed according to combinations of the detection results of the position detection mechanism 40 and the detection result of the state detection mechanism 70.

In the connector 100 according to the present embodiment, the lock maintenance member 50 which restricts the movement of the lock member 20 is manually operated. Thus, as compared with a connector comprising a solenoid, the connector 100 can be formed at low cost and miniaturized, and a state of the lock maintenance member 50 can be surely switched.

In addition, by provision of two detection mechanisms, i.e. the position detection mechanism 40 and the state detection mechanism 70, it can be identified whether a situation where electric power is unable to be supplied is caused by the lock portion 24 not locking the locked portion 202 or by the lock maintenance member 50 not maintaining the lock.

While the present invention has been described with specific embodiments, the present invention is not limited to the aforementioned embodiments. The present invention is variously modifiable and applicable.

For example, the aforementioned lock member 20 is exposed to an outside of the housing 10. Most of the lock member 20 may be accommodated into the housing 10 if the first operation portion 26 is operable from the outside of the housing 10.

Although the aforementioned first switch SW1 is normally closed type switch, the first switch SW1 may be normally open type switch. Although the first switch SW1 is a limit switch, the first switch SW1 may be another type of switch. Although the second switch SW2 is a slide switch, the second switch SW2 may be another type of switch.

Furthermore, although the position detection mechanism 40 and the state detection mechanism 70 are formed of the first parallel circuit PC1 and the second parallel circuit PC2, respectively in above-described embodiment, the position detection mechanism 40 may be formed of a series circuit and the state detection mechanism 70 may be formed of a series circuit.

Figure 20:
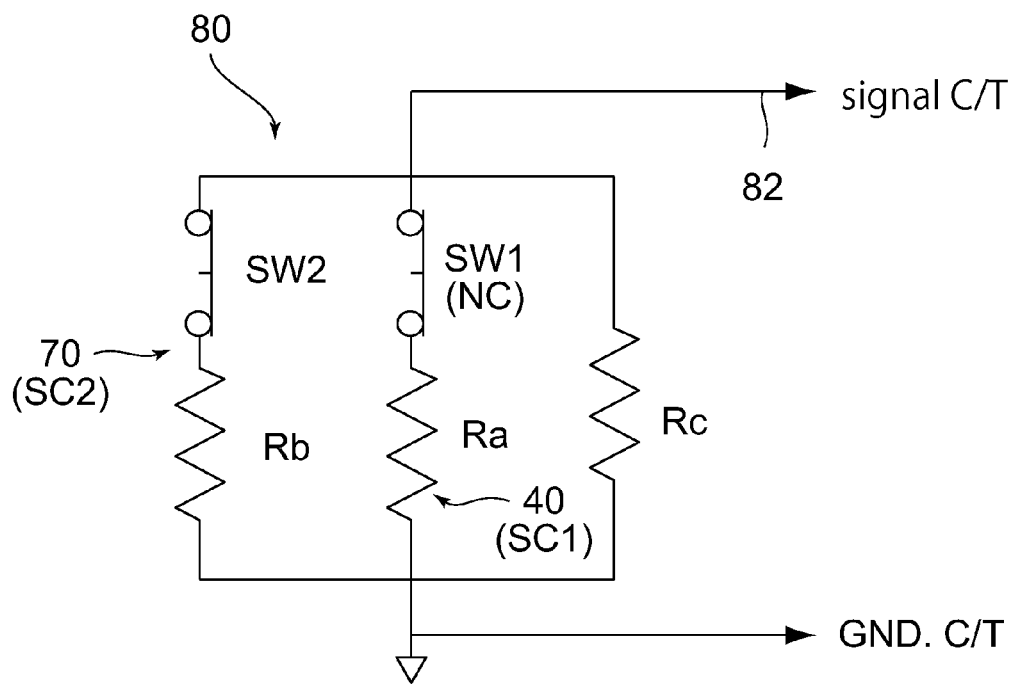
FIG. 20 is a circuit diagram showing a modification of the comprehensive detection mechanism of FIG. 18.
Figure 21:
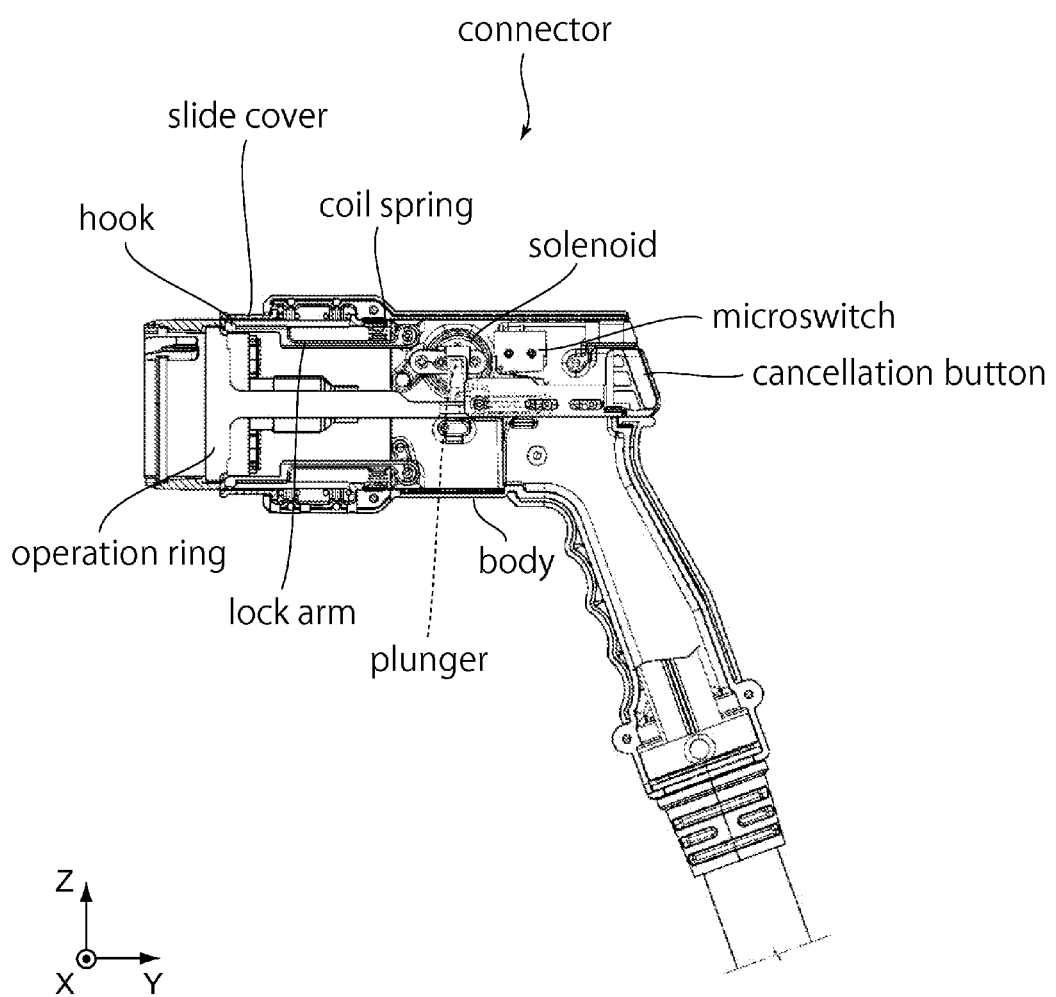
FIG. 21 is a cross-sectional view showing the connector of Patent Document 1.

For example, as shown in FIG. 20, the position detection mechanism 40 may have a first series circuit SC1 which is formed by connecting the first switch SW1 and the first resistor Ra in series, and the state detection mechanism 70 may have a second series circuit SC2 which is formed by connecting the second switch SW2 and the second resistor Rb in series. Furthermore, the first series circuit SC1, the second series circuit SC2 and the third resistor Rc may be connected in parallel to form the comprehensive detection mechanism 80. Also in that case, the output portion 82 can output a signal output which includes the detection result of the position detection mechanism 40 and the detection result of the state detection mechanism 70, which are superposed with each other.

The present application is based on a Japanese patent application of JP2013-216790 filed before the Japan Patent Office on Oct. 17, 2013, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector mateable with a mating connector having a locked portion, the connector comprising:
   a lock member, wherein: the lock member has a lock portion; the lock member is selectively positionable at a lock position or an unlock position; when the lock member is positioned at the lock position, the lock portion locks the locked portion to lock a mating of the connector with the mating connector; and, when the lock member is positioned at the unlock position, the connector is removable from the mating connector;
   a position detection mechanism which detects whether the lock member is positioned at the lock position or the unlock position;
   a lock maintenance member selectively takable a maintenance state or a permission state, wherein: when the lock maintenance member is under the maintenance state, the lock maintenance member restricts a movement of the lock member from the lock position to the unlock position to maintain a lock of the mating; and, when the lock maintenance member is under the permission state, the lock maintenance member permits the lock member to move from the lock position to the unlock position; and
   a state detection mechanism which detects whether the lock maintenance member is under the maintenance state or the permission state.

2. The connector as recited in claim 1, wherein:
   the lock member has a first operation portion;
   when the first operation portion is operated toward a first operation direction, the lock member is moved from the lock position to the unlock position;
   the lock maintenance member has a second operation portion; and
   when the second operation portion is operated toward a second operation direction intersecting the first operation direction, the lock maintenance member transits a state thereof from the maintenance state to the permission state.

3. The connector as recited in claim 2, wherein:
   the connector further comprises a housing; and
   the lock maintenance member is a slider held by the housing so as to be movable along the second operation direction.

4. The connector as recited in claim 3, wherein:
   the lock member further comprises a pivot and a restricted portion;
   the pivot is positioned between the lock portion and the first operation portion;
   the lock member is supported by the housing so that the lock portion and the first operation portion are movable in a seesaw manner with the pivot as a center;
   the lock maintenance member is provided with a stopper projecting in a third direction intersecting both the first operation direction and the second operation direction; and
   when the lock maintenance member is under the permission state, the stopper does not restrict the restricted portion to move along the first operation direction; and, when the lock maintenance member is under the maintenance state, the stopper restricts the restricted portion to move along the first operation direction.

5. The connector as recited in claim 2, wherein the lock member is formed of a single member having the lock portion and the first operation portion.

6. The connector as recited in claim 1, further comprising a bias member which urges the lock member to move toward the lock position.

7. The connector as recited in claim 1, wherein:
   the position detection mechanism and the state detection mechanism are connected with each other to form a single comprehensive detection mechanism which has a single output portion; and
   a signal output from the output portion of the comprehensive detection mechanism includes a detection result of the position detection mechanism and a detection result of the state detection mechanism, which are superposed with each other.

8. The connector as recited in claim 7, wherein:
   the position detection mechanism comprises a first switch and a first variable impedance;
   a switching condition of the first switch is changed over in accordance with whether the lock member is positioned at the lock position or the unlock position;

an impedance of the first variable impedance is changed over in accordance with the switching condition of the first switch;

the state detection mechanism comprises a second switch and a second variable impedance;

a switching condition of the second switch is changed over in accordance with whether the lock maintenance member is under the maintenance state or the permission state;

an impedance of the second variable impedance is changed over in accordance with the switching condition of the second switch;

the comprehensive detection mechanism comprises a combined variable impedance which has the first variable impedance and the second variable impedance; and the combined variable impedance has four kinds of impedances according to combinations of the detection result of the position detection mechanism and the detection result of the state detection mechanism.

9. The connector as recited in claim 8, wherein:

the position detection mechanism further comprises a first resistor;

the first resistor and the first switch are connected in parallel to form a first parallel circuit;

the state detection mechanism further comprises a second resistor having a resistance value which is different from a resistance value of the first resistor;

the second resistor and the second switch are connected in parallel to form a second parallel circuit; and the comprehensive detection mechanism has a circuit in which the first parallel circuit and the second parallel circuit are connected in series.

10. A system comprising the connector as recited in claim 1, wherein four kinds of the detection results are displayed according to combinations of the detection result of the position detection mechanism and the detection result of the state detection mechanism.

\* \* \* \* \*